US012545972B2

(12) United States Patent
Hata et al.

(10) Patent No.: US 12,545,972 B2
(45) Date of Patent: Feb. 10, 2026

(54) STEEL SHEET, MEMBER, AND METHODS FOR MANUFACTURING THE SAME

(71) Applicant: JFE Steel Corporation, Tokyo (JP)

(72) Inventors: Katsuya Hata, Tokyo (JP); Shimpei Yoshioka, Tokyo (JP); Shinjiro Kaneko, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 384 days.

(21) Appl. No.: 18/277,883

(22) PCT Filed: Jan. 28, 2022

(86) PCT No.: PCT/JP2022/003321
§ 371 (c)(1),
(2) Date: Aug. 18, 2023

(87) PCT Pub. No.: WO2022/185805
PCT Pub. Date: Sep. 9, 2022

(65) Prior Publication Data
US 2024/0132987 A1   Apr. 25, 2024
US 2024/0229181 A9   Jul. 11, 2024

(30) Foreign Application Priority Data

Mar. 2, 2021 (JP) ................. 2021-032531

(51) Int. Cl.
| C21D 9/46 | (2006.01) |
| C21D 1/18 | (2006.01) |
| C21D 1/84 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/22 | (2006.01) |
| C22C 38/24 | (2006.01) |
| C22C 38/28 | (2006.01) |
| C22C 38/38 | (2006.01) |
| C22C 38/60 | (2006.01) |

(52) U.S. Cl.
CPC ................ *C21D 9/46* (2013.01); *C21D 1/18* (2013.01); *C21D 1/84* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/24* (2013.01); *C22C 38/28* (2013.01); *C22C 38/38* (2013.01); *C22C 38/60* (2013.01); *C21D 2211/001* (2013.01); *C21D 2211/002* (2013.01); *C21D 2211/008* (2013.01)

(58) Field of Classification Search
None
See application file for complete search history.

(56) References Cited

U.S. PATENT DOCUMENTS

| 2018/0100212 A1 | 4/2018 | Ono et al. |
| 2019/0003009 A1 | 1/2019 | Kawata et al. |
| 2021/0062288 A1 | 3/2021 | Nishio et al. |
| 2021/0262073 A1* | 8/2021 | Tabata .................... C22C 38/24 |
| 2022/0002827 A1 | 1/2022 | Hirashima et al. |
| 2022/0220577 A1 | 7/2022 | Hirashima et al. |
| 2023/0151451 A1 | 5/2023 | Kawasaki et al. |

FOREIGN PATENT DOCUMENTS

| CN | 102822375 A | 12/2012 |
| CN | 110177892 A | 8/2019 |
| CN | 111344423 A | 6/2020 |
| EP | 2327810 A1 | 6/2011 |
| EP | 3 309 273 A1 | 4/2018 |

(Continued)

OTHER PUBLICATIONS

Leslie, W., The Physical Metallurgy of Steels, 1985, 3 pages, Maruzen Co., Ltd., with English translation of relevant parts.
Zhang et al., "Modern Continuous Hot-dip Galvanizing of Steel Strip", Metallurgical Industry Press, (Jan. 31, 2007), pp. 319-320, with English translation. (7 pages).
Office Action (The First Office Action) issued Mar. 31, 2025, by the State Intellectual Property Office of People's Republic of China in corresponding Chinese Patent Application No. 202280017757.4 and an English translation with Concise explanation of relevance of the Office Action. (19 pages).

(Continued)

*Primary Examiner* — Anthony M Liang
(74) *Attorney, Agent, or Firm* — Buchanan Ingersoll & Rooney PC

(57) ABSTRACT

A steel sheet has a certain chemical composition and a steel microstructure containing, in area fraction, martensite: 40% or more and 78% or less, bainite: 20% or more and 58% or less, and retained austenite: 2% or more. Carbides in tempered martensite in the martensite have an average particle size of 0.40 μm or less, an average amount of C in the retained austenite is 0.5% by mass or more, a Si concentration in a region within 100 μm in a thickness direction from a surface of the steel sheet is 1.3% by mass or less, and a tensile strength is 1,470 MPa or more.

16 Claims, No Drawings

(56) References Cited

FOREIGN PATENT DOCUMENTS

| EP | 3 543 367 A1 | 9/2019 |
|---|---|---|
| EP | 3 712 284 A1 | 9/2020 |
| EP | 3 715 493 A1 | 9/2020 |
| EP | 3786310 A1 | 3/2021 |
| JP | 6288394 B2 | 3/2018 |
| JP | 6291289 B2 | 3/2018 |
| JP | 6635236 B1 | 1/2020 |
| JP | 6645637 B1 | 2/2020 |
| KR | 10-2018-0016518 A | 2/2018 |
| KR | 10-2020-0093002 A | 8/2020 |
| WO | 2016152163 A1 | 9/2016 |
| WO | 2019208556 A1 | 10/2019 |
| WO | 2020090303 A1 | 5/2020 |
| WO | 2020230796 A1 | 11/2020 |
| WO | 2021200580 A1 | 10/2021 |

OTHER PUBLICATIONS

Office Action (Request for the Submission of an Opinion) issued Apr. 15, 2025, by the Korean Intellectual Property Office in corresponding Korean Patent Application No. 10-2023-7028535 and an English translation with the Concise explanation of relevance of the Office Action. (15 pages).

International Search Report and Written Opinion for International Application No. PCT/JP2022/003321, dated Mar. 15, 2022, 6 pages.

The Extended European Search Report issued Jun. 27, 2024, by the European Patent Office in corresponding European Patent Application No. 22 762 864.1-1103. (8 pages).

* cited by examiner

STEEL SHEET, MEMBER, AND METHODS FOR MANUFACTURING THE SAME

CROSS REFERENCE TO RELATED APPLICATIONS

This is the U.S. National Phase application of PCT/JP2022/003321, filed Jan. 28, 2022, which claims priority to Japanese Patent Application No. 2021-032531, filed Mar. 2, 2021, the disclosures of these applications being incorporated herein by reference in their entireties for all purposes.

FIELD OF THE INVENTION

The present invention relates to a high-strength steel sheet that is suitable for cold press forming and used in, for example, automobiles and household electrical appliances through a cold press forming process, a member obtained using the high-strength steel sheet as a steel material, and methods for manufacturing the same.

BACKGROUND OF THE INVENTION

In recent years, with an increasing demand for reductions in the weights of automobile bodies, there have been advances in the application of high-strength steel sheets having a tensile strength TS (hereinafter, may be simply referred to as TS alone) of 1,320 to 1,470 MPa-grade to vehicle frame parts, such as center pillar R/F (reinforcements), bumpers, and impact beam parts. From the viewpoint of further reducing the weights, studies on increasing the strength to 1.8 GPa-grade or higher strength are also being started. Hitherto, studies have been actively conducted on an increase in the strength by hot pressing, which includes pressing at a high temperature; however, recently, the application of high-strength steels in cold pressing has been studied again from the viewpoints of cost and productivity.

However, in the case where a high-strength steel sheet having a TS of 1,470 MPa-grade or higher is formed by cold pressing, a decrease in ductility tends to cause cracking while pressing, and thus such a high-strength steel sheet is applied to only parts having relatively simple shapes. Therefore, high-strength steel sheets are required to have formability higher than that in the related art. Moreover, in the case where a high-strength steel sheet having a TS of 1,470 MPa-grade or higher is formed into a part by cold pressing, a delayed fracture becomes significant as a result of an increase in residual stress inside the part and a deterioration of delayed fracture resistance of the steel material itself. The delayed fracture is a phenomenon that occurs as follows: when a part is placed in a hydrogen entry environment while a high stress is applied to the part, hydrogen enters the steel sheet and reduces interatomic bonding forces or causes local deformation, resulting in the formation of microcracks, and the microcracks propagate, resulting in a fracture.

Furthermore, it has been recently confirmed that, in the assembling of automobile bodies and parts, when a high-strength hot-dip galvanized steel sheet and a high-strength hot-dip galvannealed steel sheet are subjected to spot welding or when spot welding a high-strength cold-rolled steel sheet with a galvanized steel sheet, liquid metal embrittlement cracking (LMEC, hereinafter also referred to as LME cracking) is caused at a weld. The LME cracking is caused by melting of zinc in a zinc coated layer during spot welding, entry of molten zinc into a grain boundary of a steel microstructure of a weld, and action of stress generated upon opening of a welding electrode. Even for an ungalvanized high-strength cold-rolled steel sheet, spot welding with a galvanized steel sheet may cause LME cracking due to contact between zinc melted in the galvanized steel sheet and the high-strength cold-rolled steel sheet. In high-strength steel sheets having a TS of 780 MPa or more, the risk of the occurrence of LME cracking is concerned because of their high Si contents.

Various high-strength steel sheets have been developed for applications to automotive parts. For example, Patent Literature 1 discloses a high-strength steel sheet that contains specified alloy components, that has a steel microstructure including a main phase composed of bainite and tempered martensite, and that is excellent in steel shape.

Patent Literature 2 discloses a high-strength steel sheet having excellent formability.

Patent Literature 3 discloses a high-strength steel sheet having a surface layer microstructure that includes a main phase composed of ferrite and bainite to combine formability and hydrogen embrittlement resistance at a high level.

PATENT LITERATURE

PTL 1: Japanese Patent No. 6291289
PTL 2: Japanese Patent No. 6288394
PTL 3: Japanese Patent No. 6635236

SUMMARY OF THE INVENTION

However, in the technique of Patent Literature 1, the amount of C is small, and it may be impossible to achieve a strength TS of 1,470 MPa-grade. In addition, ductility may also deteriorate due to a small amount of retained austenite and a small average amount of C in the retained austenite. In the technique of Patent Literature 2, since the cooling rate is low and self-tempered martensite tempered at high temperature is contained, carbides in the self-tempered martensite are coarsened, which may deteriorate delayed fracture resistance. Furthermore, the tempering temperature of martensite is high, and it may be impossible to achieve a strength TS of 1,470 MPa-grade. In addition, carbides in tempered martensite are coarsened, which may deteriorate delayed fracture resistance.

In the technique of Patent Literature 3, the amount of martensite in the surface layer is small, i.e., 30% or less, and this martensite is presumably hard martensite in which carbon is concentrated in γ during ferrite transformation. Therefore, this martensite is likely to act as the origins of cracks, and delayed fracture resistance may deteriorate.

Aspects of the present invention have been made in order to solve the problems described above, and an object according to aspects of the present invention is to provide a steel sheet and a member that have a tensile strength of 1,470 MPa or more (TS≥1,470 MPa) and that have excellent formability, excellent delayed fracture resistance, and excellent LME resistance, and methods for manufacturing the same.

Herein, the tensile strength refers to a tensile strength TS determined by cutting out a JIS No. 5 test piece for tensile test such that a rolling direction is the longitudinal direction, and subjecting the test piece to a tensile test in accordance with JIS Z2241.

The phrase "having excellent formability" means that an elongation El determined by cutting out a JIS No. 5 test piece for tensile test such that a rolling direction is the longitudinal direction, and subjecting the test piece to a tensile test in accordance with JIS Z2241 is 11% or more.

The phrase "having excellent delayed fracture resistance" means that no fracture is observed by the following evaluation.
(1) A strip test specimen is taken from a steel sheet at a position ¼ of the width of the coil so as to have a size of 30 mm in a rolling direction and a size of 100 mm in a direction perpendicular to the rolling direction.
(2) Edge surfaces of the test specimen having a length of 100 mm are formed by shearing. The test specimen is subjected to bending directly subsequent to shearing (without being subjected to machining to remove burrs) such that the burrs are located on the outer peripheral side of bending. The test specimen is fixed with bolts so as to maintain the shape of the test specimen during the bend forming.

In the shearing, the clearance is set to 15%, and the rake angle is set to 0 degree.

The bending is performed with a bend radius that satisfies R/t=4, where R represents a tip bend radius and t represents a sheet thickness (for example, when the sheet thickness t is 2.0 mm, the bend forming is performed with a punch having a punch tip radius of 8.0 mm) such that the inside angle of the tip is 90 degrees (V-bend).

The punch used is a U-shaped punch having a tip with the above radius (a punch including a semicircular tip R portion and a body having a thickness of 2R). A die having a corner R of 30 mm is used.

The depth the punch is pressed against the steel sheet is adjusted to form the steel sheet such that the bending angle of the tip is 90 degrees (V-shape).

The test specimen is pinched and fastened using a hydraulic jack such that the distance between flange ends of straight portions of the test specimen having been subjected to the bend forming is equal to that of the test specimen during the bend forming (such that a gap between the straight portions due to springback is cancelled out) and then fastened with bolts in this state.

The bolts are fixed so as to penetrate through holes having an elliptical shape (minor axis: 10 mm, major axis: 15 mm) and formed in advance in the strip test specimen at positions 10 mm inside from the respective short-side edges.
(3) The resulting test specimen fastened with the bolts is immersed in one liter or more per test specimen of hydrochloric acid (an aqueous hydrogen chloride solution) having a pH of 3, and a test is performed at an aqueous solution temperature of 25° C. while the pH is controlled to be constant.

The presence or absence of microcracks (initial state of delayed fracture) that can be visually observed (having a length of 1 mm or more) is constantly examined visually or using a camera. The time taken from the start of the immersion until the start of the formation of microcracks is measured as a delayed-fracture time.
(4) The test specimen is determined as "no fracture" when a fracture does not occur even after a lapse of $10^{(-0.55 \times (TS-1760)+0.3)}$ hours (10 to the power of ($-0.0055 \times (TS-1760)+0.3$)) hours) since the start of the immersion.

The phrase "having excellent LME resistance" means that no crack of 0.1 mm or more is observed in the following resistance welding cracking test described below.
(1) One test specimen prepared by cutting a steel sheet to 30 mm×100 mm such that a direction perpendicular to the rolling direction is the longitudinal direction, and another test specimen made of a 980 MPa-grade hot-dip galvanized steel sheet are used to perform resistance welding (spot welding). A sheet set of two steel sheets stacked on top of each other is subjected to resistance spot welding using a servomotor pressure-type single-phase alternating current (50 Hz) resistance welding machine attached to a welding gun, while the sheet set is tilted by 5°.

The welding conditions are a welding pressure of 3.8 kN and a holding time of 0.2 seconds. The welding current is 5.7 to 6.2 kA, the current application time is 21 cycles, and the holding time is 5 cycles.
(2) After welding, the test specimen is cut in half, and a cross section is observed with an optical microscope.
(3) When no crack of 0.1 mm or more is observed, the test specimen is determined to have excellent LME resistance.

To solve the foregoing problems, the inventors of the present invention have conducted intensive studies and have obtained the following findings.
i) It was found that a high-strength steel sheet having excellent formability and a tensile strength of 1,470 MPa or more (TS≥1,470 MPa) was obtained by utilizing martensite to increase the strength, and by utilizing bainite transformation at a high C content of 0.24% by mass or more to reliably form retained austenite.
ii) It was found that delayed fracture resistance could be improved in a high-strength steel sheet with TS≥1,470 MPa by inhibiting the coarsening of carbides in tempered martensite in martensite.
iii) It was found that in order to appropriately control the particle size of carbides, the C, Si, and Mn contents and the cooling rate and the tempering temperature after bainite transformation need to be optimized.
iv) The occurrence of liquid metal embrittlement is suppressed by inhibiting the concentration of Si near the surface layer, and consequently, excellent resistance weldability is exhibited (cracks are unlikely to be formed during resistance welding).

Aspects of the present invention have been made on the basis of the above findings. Specifically, aspects of the present invention provide the following.

[1] A steel sheet having a chemical composition containing, by mass %,
C: 0.24% or more and 0.40% or less,
Si: 0.2% or more and 1.0% or less,
Mn: 1.5% or more and 3.5% or less,
P: 0.002% or more and 0.010% or less,
S: 0.0002% or more and 0.0020% or less,
sol. Al: 0.50% or less (not including 0%), and
N: 0.0006% or more and 0.01% or less,
with the balance being Fe and incidental impurities; and
a steel microstructure containing, in area fraction, martensite: 40% or more and 78% or less, bainite: 20% or more and 58% or less, and retained austenite: 2% or more,
wherein carbides in tempered martensite in the martensite have an average particle size of 0.40 μm or less,
an average amount of C in the retained austenite is 0.5% by mass or more,
a Si concentration in a region within 100 μm in a thickness direction from a surface of the steel sheet is 1.3% by mass or less, and
a tensile strength is 1,470 MPa or more.
[2] The steel sheet according to [1] above, wherein a hardness difference in microhardness between the bainite and the martensite is 1.5 GPa or more.
[3] The steel sheet according to [1] or [2] above, wherein the chemical composition further contains, by mass %, one or two or more selected from:

Nb: 0.1% or less,
Ti: 0.10% or less,
B: 0.0050% or less,
Cu: 1% or less, and
Ni: 1% or less.
[4] The steel sheet according to any one of [1] to [3] above, wherein the chemical composition further contains, by mass %, one or two or more selected from:
Cr: 1.0% or less,
Mo: less than 0.3%,
V: 0.45% or less,
Zr: 0.2% or less, and
W: 0.2% or less.
[5] The steel sheet according to any one of [1] to [4] above, wherein the chemical composition further contains, by mass %, one or two selected from:
Sb: 0.1% or less, and
Sn: 0.1% or less.
[6] The steel sheet according to any one of [1] to [5] above, wherein the chemical composition further contains, by mass %, one or two or more selected from:
Ca: 0.0050% or less,
Mg: 0.01% or less, and
REM: 0.01% or less.
[7] The steel sheet according to any one of [1] to [6] above, having a coated layer on a surface of the steel sheet.
[8] A member obtained by subjecting the steel sheet according to any one of [1] to [7] to at least one of forming and joining.
[9] A method for manufacturing a steel sheet, the method being a method for manufacturing the steel sheet according to any one of [1] to [6] above, the method including:
a hot rolling step of hot-rolling a steel slab to obtain a hot-rolled steel sheet;
a cold rolling step of, after the hot rolling step, cold-rolling the hot-rolled steel sheet to obtain a cold-rolled steel sheet;
a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more, subsequently cooling the resulting steel sheet to a holding temperature of an Ms temperature or higher and (Ms temperature+200° C.) or lower at a first average cooling rate of 5° C./s or more, holding the steel sheet at the holding temperature for a holding time of 1 second or more and 1,000 seconds or less, and
cooling the steel sheet to a finish cooling temperature of 250° C. or lower at a second average cooling rate of 5° C./s or more; and
an overaging treatment step of, after the continuous annealing step, holding the steel sheet in a temperature range of 150° C. or higher and 250° C. or lower for 30 seconds or more and 1,500 seconds or less.
[10] The method for manufacturing a steel sheet according to [9] above, having, before or after the overaging treatment step, a coating step of subjecting a surface of the steel sheet to coating treatment.
[11] A method for manufacturing a member, the method having a step of subjecting a steel sheet manufactured by the method for manufacturing a steel sheet according to [9] or above to at least one of forming and joining.

According to aspects of the present invention, a high-strength steel sheet having excellent formability, excellent delayed fracture resistance, and excellent LME resistance is provided. This improvement in properties enables a high-strength steel sheet for cold press forming to be applied to parts that are difficult to form and contributes to improvements in the strengths of parts and reductions in the weights of the parts.

DETAILED DESCRIPTION OF EMBODIMENTS OF THE INVENTION

Embodiments of the present invention will be described below. The present invention is not limited to the following embodiments.

A steel sheet according to aspects of the present invention has a chemical composition containing, by mass %, C: 0.24% or more and 0.40% or less, Si: 0.2% or more and 1.0% or less, Mn: 1.5% or more and 3.5% or less, P: 0.002% or more and 0.010% or less, S: 0.0002% or more and 0.0020% or less, sol. Al: 0.50% or less (not including 0%), and N: 0.0006% or more and 0.01% or less, with the balance being Fe and incidental impurities, and contains, in area fraction, martensite: 40% or more and 78% or less, bainite: 20% or more and 58% or less, and retained austenite: 2% or more.

Carbides in tempered martensite in the martensite have a particle size of 0.40 μm or less, an average amount of C in the retained austenite is 0.5% by mass or more, a Si concentration in a region within 100 μm in a thickness direction from a surface of the steel sheet (concentration in a Si concentrated portion in a surface layer) is 1.3% by mass or less, and a tensile strength is 1,470 MPa or more.

Chemical Composition

First, the content of each component will be described. The symbol "%" representing the content of a component means "% by mass", unless otherwise mentioned.

C: 0.24% or More and 0.40% or Less

C is contained in order to increase the strength of martensite or bainite to ensure TS≥1,470 MPa. C is contained in order to form fine carbides serving as hydrogen-trapping sites in tempered martensite or bainite. A C content of less than 0.24% results in a failure to achieve predetermined strength while maintaining excellent delayed fracture resistance. To achieve TS≥1,470 MPa while maintaining excellent delayed fracture resistance, the C content is 0.24% or more. A C content of more than 0.40% results in excessively high strength to make it difficult to obtain sufficient delayed fracture resistance. Accordingly, the C content is 0.24% or more and 0.40% or less. The C content is preferably 0.25% or more, more preferably 0.26% or more, still more preferably 0.28% or more. The C content is preferably 0.37% or less, more preferably 0.35% or less, still more preferably 0.33% or less.

Si: 0.2% or More and 1.0% or Less

Si is contained as a strengthening element through solid solution hardening and in order to inhibit precipitation of carbides during bainite transformation to obtain retained austenite. A decrease in the Si content increases the melting point of zinc, and thus the grain boundary erosion of zinc during spot welding can be suppressed to improve LME resistance. A Si content of less than 0.2% results in an increase in the amount of carbides precipitated during bainite transformation and a decrease in the amount of retained austenite, and results in a deterioration of formability. The Si content is preferably 0.3% or more, more preferably 0.4% or more. On the other hand, the Si content is 1.0% or less, preferably 0.8% or less, more preferably 0.7% or less in view of welding safety and from the viewpoint of controlling a Si concentration in the surface layer to a predetermined range.

Mn: 1.5% or More and 3.5% or Less

Mn is contained in order to improve the hardenability of steel to cause the total area fraction of martensite and bainite to fall within a predetermined range. Mn is contained in order to immobilize S in steel in the form of MnS to reduce hot shortness. Mn is an element that particularly promotes the formation and coarsening of MnS at a central portion in the thickness direction, combines with particles of inclusions, such as $Al_2O_3$, (Nb, Ti) (C, N), TiN, and TiS, and precipitates. These can be avoided by controlling the segregation state of Mn. In order to stabilize retained austenite to obtain retained austenite, Mn is contained in an amount of 1.5% or more. However, in view of stability of weldability, the upper limit of the Mn content is 3.5%. In addition, from the viewpoint of obtaining sufficient delayed fracture resistance, the upper limit of the Mn content is 3.5%. Thus, the Mn content is 1.5% or more and 3.5% or less. The Mn content is preferably 1.8% or more, more preferably 2.1% or more, still more preferably 2.3% or more. The Mn content is preferably 3.3% or less, more preferably 3.1% or less, still more preferably 3.0% or less.

P: 0.002% or More and 0.010% or Less

P is an element that strengthens steel; however, a high P content significantly deteriorates delayed fracture resistance and spot weldability. Accordingly, the P content is 0.010% or less. From the above viewpoint, the P content is preferably 0.006% or less. On the other hand, the lower limit that is industrially feasible at present is 0.002%. Thus, the P content is 0.002% or more and 0.010% or less.

S: 0.0002% or More and 0.0020% or Less

S needs to be precisely controlled because S has a significant effect on delayed fracture resistance through the formation of, for example, MnS, TiS, and Ti(C, S). To reduce adverse effects of inclusion clusters, the S content needs to be at least 0.0020% or less. In order to improve delayed fracture resistance, the S content is preferably 0.0010% or less. On the other hand, the lower limit that is industrially feasible at present is 0.0002%. Thus, the S content is 0.0002% or more and 0.0020% or less.

Sol. Al: 0.50% or Less (not Including 0%)

Al is contained in order to perform sufficient deoxidization to reduce the amounts of inclusions in steel. To stably perform deoxidization, the sol. Al content is preferably 0.005% or more, more preferably 0.01% or more. On the other hand, a sol. Al content of more than 0.50% results in a deterioration of delayed fracture resistance because cementite formed during coiling is less likely to be dissolved during an annealing process. Accordingly, the sol. Al content is 0.50% or less, preferably 0.45% or less.

N: 0.0006% or More and 0.01% or Less

N is an element that forms inclusions of nitrides and carbonitrides, such as TiN, (Nb, Ti) (C, N), and AlN, in steel and deteriorates delayed fracture resistance through the formation of these. These inclusions prevent a steel microstructure specified in accordance with aspects of the present invention from being obtained and adversely affects delayed fracture resistance. To reduce such adverse effects, the N content needs to be at least 0.01% or less. The N content is preferably 0.0055% or less, more preferably 0.0050% or less. The lower limit that is industrially feasible at present is 0.0006%.

The balance other than the above has a chemical composition containing Fe (iron) and incidental impurities. Here, the steel sheet according to aspects of the present invention preferably has a chemical composition containing the above basic components with the balance being Fe and incidental impurities. Note that the following optional elements may be contained. When any of the following optional elements is contained in an amount less than the appropriate lower limit, such an optional element can be assumed to be contained as an incidental impurity.

Nb: 0.1% or Less

Nb contributes to an increase in strength through refinement of the internal structures of martensite and bainite and improves delayed fracture resistance as described above. From these viewpoints, Nb is preferably contained in an amount of 0.001% or more, more preferably 0.005% or more. A Nb content of more than 0.1% may result in the formation of a large number of Nb-based inclusion clusters distributed in a sequence of dots in the rolling direction and adversely affect delayed fracture resistance. To reduce such an adverse effect, when Nb is contained, the Nb content is 0.1% or less. The Nb content is preferably 0.08% or less, more preferably 0.06% or less.

Ti: 0.10% or Less

Ti contributes to an increase in strength through refinement of the internal structures of martensite and bainite. Ti improves delayed fracture resistance through the formation of fine Ti-based carbides and carbonitrides serving as hydrogen-trapping sites. Furthermore, Ti improves castability. From these viewpoints, the Ti content is preferably 0.002% or more, and Ti is more preferably contained in an amount of 0.005% or more. An excessively high Ti content may result in the formation of a large number of Ti-based inclusion particle clusters distributed in a sequence of dots in the rolling direction and adversely affect delayed fracture resistance. To reduce such an adverse effect, when Ti is contained, the Ti content is 0.10% or less. The Ti content is preferably 0.07% or less, more preferably 0.05% or less.

B: 0.0050% or Less

B is an element that improves the hardenability of steel and has an advantage of forming martensite and bainite with predetermined area fractions even at a low Mn content. To provide these effects of B, the B content is preferably 0.0001% or more, more preferably 0.0005% or more. In order to immobilize N, B is preferably contained in combination with 0.002% or more of Ti. On the other hand, a B content of more than 0.0050% results in not only saturation of the effects but also a decrease in the dissolution rate of cementite during annealing to cause undissolved cementite to remain, resulting in a deterioration of delayed fracture resistance.

Accordingly, when B is contained, the B content is 0.0050% or less, preferably less than 0.0035%.

Cu: 1% or Less

Cu improves corrosion resistance in a usage environment of automobiles. When Cu is contained, the following effect is obtained: corrosion products of Cu cover the surface of the steel sheet to inhibit the hydrogen entry into the steel sheet. Cu is an element that is unintentionally incorporated when scrap is utilized as a raw material. Permitting the unintentional incorporation of Cu enables recycle materials to be reused as raw materials, thus reducing the manufacturing cost. From the above viewpoints, Cu is preferably contained in an amount of 0.01% or more. Furthermore, from the viewpoint of improving delayed fracture resistance, Cu is preferably contained in an amount of 0.05% or more. However, a Cu content of more than 1% may result in surface defects. Accordingly, when Cu is contained, the Cu content is 1% or less. The Cu content is preferably 0.40% or less, more preferably 0.30% or less.

Ni: 1% or Less

Ni is also an element that has an effect of improving corrosion resistance. In addition, Ni has an effect of reducing the surface defects that are likely to be formed when Cu is contained. Accordingly, from the above viewpoints, Ni is preferably contained in an amount of 0.01% or more, more preferably 0.02% or more. However, a Ni content of more than 1% results in nonuniform scale formation in a heating furnace to cause surface defects and results in a significant increase in cost. Accordingly, when Ni is contained, the Ni content is 1% or less. The Ni content is preferably 0.20% or less, more preferably 0.10% or less.

Cr: 1.0% or Less

Cr can be added to obtain an effect of improving the hardenability of steel. To achieve the effect, Cr is preferably contained in an amount of 0.01% or more, more preferably 0.02% or more. However, a Cr content of more than 1.0% results in a decrease in the dissolution rate of cementite during annealing to cause undissolved cementite to remain, resulting in a deterioration of delayed fracture resistance. In addition, a deterioration of pitting corrosion resistance is also caused. Furthermore, a deterioration of chemical convertibility is also caused. Accordingly, when Cr is contained, the Cr content is 1.0% or less. Delayed fracture resistance, pitting corrosion resistance, and chemical convertibility each tend to start deteriorating at a Cr content of more than 0.8%. Thus, in order to prevent deteriorations of these properties, the Cr content is preferably 0.8% or less. The Cr content is more preferably 0.6% or less, still more preferably 0.4% or less.

Mo: Less than 0.3%

Mo can be added in order to obtain an effect of improving the hardenability of steel, an effect of forming fine carbides that contain Mo and serve as hydrogen-trapping sites, and an effect of improving delayed fracture resistance by refining martensite. When Nb and Ti are added in large amounts, coarse precipitates thereof are formed, and delayed fracture resistance rather deteriorates. However, the solubility limit of Mo is higher than those of Nb and Ti. When Mo is added in combination with Nb and Ti, fine complex precipitates of Nb, Ti, and Mo are formed to refine the microstructure. Accordingly, the addition of Mo in combination with small amounts of Nb and Ti enables dispersion of a large number of fine carbides while refining the microstructure without leaving coarse precipitates, thus improving delayed fracture resistance. To provide this effect, Mo is preferably contained in an amount of 0.01% or more, more preferably 0.02% or more. However, a Mo content of 0.3% or more deteriorates chemical convertibility. Accordingly, when Mo is contained, the Mo content is less than 0.3%. The Mo content is preferably 0.2% or less, more preferably 0.1% or less.

V: 0.45% or Less

V can be added in order to obtain an effect of improving the hardenability of steel, an effect of forming fine carbides that contain V and serve as hydrogen-trapping sites, and an effect of improving delayed fracture resistance by refining martensite. To provide these effects, the V content is preferably 0.003% or more, more preferably 0.005% or more. However, a V content of more than 0.45% significantly deteriorates castability. Accordingly, when V is contained, the V content is 0.45% or less. The V content is preferably 0.2% or less, more preferably 0.1% or less.

Zr: 0.2% or Less

Zr contributes to an increase in strength and improves delayed fracture resistance through a reduction in size of prior-$\gamma$ grains and the resulting reductions in sizes of, for example, blocks and Bain grains, which are internal structural units of martensite and bainite. Furthermore, Zr increases strength and improves delayed fracture resistance through the formation of fine Zr-based carbides and carbonitrides serving as hydrogen-trapping sites. Zr also improves castability. From the above viewpoints, the Zr content is preferably 0.001% or more, more preferably 0.005% or more. However, the addition of a large amount of Zr results in an increase in coarse ZrN- and ZrS-based precipitates that remain undissolved during slab heating in the hot rolling step, thereby deteriorating delayed fracture resistance. Accordingly, when Zr is contained, the Zr content is 0.2% or less. The Zr content is preferably 0.05% or less, more preferably 0.01% or less.

W: 0.2% or Less

W contributes to an increase in strength and an improvement in delayed fracture resistance through the formation of fine W-based carbides and carbonitrides serving as hydrogen-trapping sites. From the above viewpoints, W is preferably contained in an amount of 0.005% or more, more preferably 0.01% or more. However, a W content of more than 0.2% results in an increase in coarse precipitates that remain undissolved during slab heating in the hot rolling step, thereby deteriorating delayed fracture resistance. Therefore, when W is contained, the W content is 0.2% or less. The W content is preferably 0.1% or less, more preferably 0.05% or less.

Sb: 0.1% or Less

Sb suppresses oxidation and nitridation of the surface layer to thereby suppress decreases in C and B. The suppression of the decreases in C and B inhibits the formation of ferrite in the surface layer to contribute to an increase in strength and an improvement in delayed fracture resistance. From the above viewpoints, the Sb content is preferably 0.002% or more, more preferably 0.005% or more. However, an Sb content of more than 0.1% results in a deterioration of castability and results in segregation of Sb at prior-$\gamma$ grain boundaries, thereby deteriorating delayed fracture resistance. Therefore, when Sb is contained, the Sb content is 0.1% or less. The Sb content is preferably 0.06% or less, more preferably 0.04% or less.

Sn: 0.1% or Less

Sn suppresses oxidation and nitridation of the surface layer to thereby suppress decreases in the C and B contents in the surface layer. The suppression of the decreases in C and B inhibits the formation of ferrite in the surface layer to contribute to an increase in strength and an improvement in delayed fracture resistance. From the above viewpoints, the Sn content is preferably 0.002% or more, more preferably 0.004% or more. However, a Sn content of more than 0.1% results in a deterioration of castability and results in segregation of Sn at prior-$\gamma$ grain boundaries, thereby deteriorating delayed fracture resistance. Therefore, when Sn is contained, the Sn content is 0.1% or less. The Sn content is preferably 0.04% or less, more preferably 0.02% or less.

Ca: 0.0050% or Less

Ca immobilizes S in the form of CaS to improve delayed fracture resistance. To provide this effect, Ca is preferably contained in an amount of 0.0001% or more. The Ca content is more preferably 0.0005% or more. However, a Ca content of more than 0.0050% results in deteriorations of surface quality and bendability. Therefore, when Ca is contained, the Ca content is 0.0050% or less.

Mg: 0.01% or Less

Mg immobilizes 0 in the form of MgO to improve delayed fracture resistance. To provide this effect, Mg is preferably contained in an amount of 0.0001% or more. However, a Mg content of more than 0.01% results in deteriorations of surface quality and bendability. Accordingly, when Mg is contained, the Mg content is 0.01% or less. The Mg content is preferably 0.005% or less, more preferably 0.001% or less.

REM: 0.01% or Less

A REM reduces the size of inclusions and reduces fracture origins to thereby improve bendability and delayed fracture resistance. To provide this effect, a REM is preferably contained in an amount of 0.0001% or more. However, a REM content of more than 0.01% results in, on the contrary, the coarsening of inclusions and deteriorates bendability and delayed fracture resistance. Therefore, when a REM is contained, the REM content is 0.01% or less. The REM content is preferably 0.004% or less, more preferably 0.002% or less.

Steel Microstructure

A steel microstructure of the steel sheet according to aspects of the present invention has the following features.

(Feature 1) In area fraction, 40% or more and 78% or less of martensite, 20% or more and 58% or less of bainite, and 2% or more of retained austenite are contained.

(Feature 2) An average amount of C in retained austenite is 0.5% by mass or more.

(Feature 3) Carbides in tempered martensite in martensite have an average particle size of 0.40 μm or less.

(Feature 4 (suitable requirement)) A hardness difference in microhardness between bainite and martensite is 1.5 GPa or more.

(Feature 1) In area fraction, 40% or more and 78% or less of martensite, 20% or more and 58% or less of bainite, and 2% or more of retained austenite are contained.

To obtain high strength of TS≥1,470 MPa, the area fraction of martensite in the steel microstructure is 40% or more. When the area fraction of martensite is less than this, the amounts of bainite and retained austenite increase, resulting in a decrease in strength. To obtain higher TS, the area fraction of martensite is preferably 50% or more. On the other hand, when the area fraction of martensite is more than 78%, the amounts of bainite and retained austenite are insufficient, resulting in a deterioration of formability. To obtain higher formability, the area fraction of martensite is preferably 70% or less. Note that, in accordance with aspects of the present invention, martensite includes tempered martensite in which carbides are precipitated.

Bainite is a microstructure excellent in strength and formability. To obtain high formability, the area fraction of bainite is 20% or more. When the area fraction of bainite is less than this, the amount of martensite increases, resulting in a deterioration of formability. With the formation of bainite, the amount of retained austenite increases. Thus, the area fraction of bainite is preferably 30% or more. On the other hand, when the area fraction of bainite is more than 58%, the amount of martensite decreases, resulting in a decrease in strength. Accordingly, the area fraction of bainite is 58% or less, and to obtain higher strength, preferably 50% or less.

Retained austenite enhances the balance between strength and ductility. When the area fraction of retained austenite is less than 2%, a good balance is not achieved between strength and ductility. Thus, the area fraction of retained austenite is 2% or more. To obtain a better balance between strength and ductility, the area fraction of retained austenite is preferably 3% or more, more preferably 4% or more. Although the upper limit is not specified, when the amount of retained austenite is excessively large, the retained austenite is transformed into martensite during forming, resulting in an increase in the origins of delayed fractures. The area fraction of retained austenite is preferably 20% or less, more preferably 15% or less. In accordance with aspects of the present invention, retained austenite satisfies (Feature 2) of the following conditions.

The presence of ferrite decreases the strength because ferrite is very soft. In addition, because of a large difference in hardness from martensite, during deformation, strain may concentrate at the interface between martensite and ferrite and acts as a fracture origin, resulting in deterioration of delayed fracture resistance. Therefore, the area fraction of ferrite is preferably 3% or less, more preferably 0%. Pearlite is a microstructure composed of lamellar ferrite and cementite. The formation of pearlite decreases the amount of C in martensite, and the strength may decrease. The area fraction of pearlite is preferably 3% or less, more preferably 0%. That is, in accordance with aspects of the present invention, the total area fraction of ferrite and pearlite is preferably 6% or less, more preferably 2%, still more preferably 0%.

(Feature 2) An average amount of C in retained austenite is 0.5% by mass or more.

In accordance with aspects of the present invention, an average amount of C in retained austenite is 0.5% by mass or more. As the average amount of C in retained austenite increases, the retained austenite has higher stability, and a better balance between strength and ductility is achieved. When the average amount of C in retained austenite is less than 0.5% by mass, a good balance between strength and ductility is not achieved. Furthermore, because of low stability, the amount of retained austenite that is transformed into martensite during forming increases, such martensite acts as the origin of a delayed fracture, and delayed fracture resistance may be deteriorated. Accordingly, the average amount of C in retained austenite is 0.5% by mass or more, preferably 0.7% by mass or more. The upper limit of the average amount of C in retained austenite is not specified. However, when the average amount of C in retained austenite is excessively high, the transformation of retained austenite to martensite resulting from tensile deformation does not proceed sufficiently, and sufficient work hardening ability is not obtained. The average amount of C in retained austenite is preferably 2.0% by mass or less.

(Feature 3) Carbides in tempered martensite in the martensite have an average particle size of 0.40 μm or less. In the steel microstructure according to aspects of the present invention, the feature 3 is important for improving delayed fracture resistance of the steel sheet. Carbides in tempered martensite have an average particle size of 0.40 μm or less. When the average particle size of the carbides is 0.40 μm or less, delayed fracture resistance can be improved. When the carbides are further coarsened, delayed fracture resistance may be deteriorated. The average particle size is preferably 0.38 μm or less, more preferably 0.36 μm or less. The lower limit is not particularly limited; however, to improve toughness, the average particle size of the carbides is preferably 0.001 μm or more, more preferably 0.01 μm or more.

(Feature 4 (suitable requirement)) A hardness difference in microhardness between bainite and martensite is 1.5 GPa or more.

In the steel microstructure according to aspects of the present invention, the feature 4 is important for obtaining high formability. Presumably, as the difference in hardness between bainite and martensite increases, a larger plastic deformation gradient is formed during plastic deformation to increase the density of geometrically necessary (GN) dislocations accumulated in bainite. Therefore, as the difference in hardness increases, the amount of work hardening of bainite due to the GN dislocation density increases, and higher elongation is obtained. Thus, the difference in hardness between bainite and martensite is preferably 1.5 GPa or more. The upper limit is not particularly limited. However, when the difference in hardness is excessively large, stretch flangeability tends to deteriorate. Accordingly, the difference in hardness between bainite and martensite is preferably 15 GPa or less, more preferably 13 GPa or less.

(Conditions for Measurement of Microstructure)

The metallic microstructure is quantified by polishing an L-section (a section parallel to the rolling direction and perpendicular to a steel sheet surface) of the steel sheet, then etching the section in nital, observing the section at a ¼ thickness position from the steel sheet surface with a SEM at a magnification of 2,000× in four fields of view, and subjecting a captured microstructure image to image analysis. Here, martensite is a microstructure that appears gray in SEM. In the martensite, tempered martensite is a microstructure containing fine carbides in martensite. On the other hand, bainite and ferrite are regions that appear a black contrast in SEM. Although tempered martensite and bainite include trace amounts of carbides, nitrides, sulfides, and oxides inside thereof, it is difficult to exclude them, and thus area fractions of regions that include these are measured as the area fractions of tempered martensite and bainite. Ferrite is a microstructure that is formed by transformation from austenite at a relatively high temperature and composed of grains with a bcc lattice. Bainite is a microstructure that is formed from austenite at a relatively low temperature (equal to or higher than the martensite transformation temperature) and that contains spherical carbides dispersed in lath- or plate-shaped ferrite. Pearlite is a microstructure in which cementite is precipitated in ferrite in a lamellar form. Regarding the measurement of retained austenite, a surface layer of the steel sheet is subjected to chemical polishing with oxalic acid to a depth of 200 μm, and the surface of the sheet is analyzed by an X-ray diffraction intensity method. Calculations are made using integral intensities of peaks of $(200)\alpha$, $(211)\alpha$, $(220)\alpha$, $(200)\gamma$, $(220)\gamma$, and $(311)\gamma$ diffraction planes measured with Mo—$K_\alpha$ radiation.

The area fraction of retained austenite determined as described above is subtracted from 100%, and the residual area fraction is distributed in the proportion of martensite, bainite, ferrite, and pearlite determined by the observation of the microstructure image obtained with the SEM using a point counting method. Thus, the area fractions of martensite, bainite, ferrite, pearlite, and retained austenite can be specified.

The average amount of C in retained austenite is determined by calculating a lattice constant ($a_\gamma$) of γ from a {220} peak angle of γ using a Co—$K_\alpha$ radiation source, and substituting the amounts of alloying elements contained into the following formula.

$$a_\gamma=3.578+0.00095(\% \text{ Mn})+0.022(\% \text{ N})+0.0056(\% \text{ Al})+0.033(\% \text{ C})$$

In the formula, (% Mn), (% N), and (% Al) are the contents (% by mass) of Mn, N, and Al, respectively. (% C) is the average amount of C (% by mass) in retained austenite.

In quantification of the sizes of carbides in tempered martensite in martensite, an L-section (a vertical section parallel to the rolling direction) of the steel sheet is polished and then etched in nital, and the section is observed at a ¼ thickness position from the steel sheet surface with a SEM at a magnification of 10,000× in two fields of view. In the observation image, white particles that are finely dispersed in the tempered martensite microstructure are regarded as carbides and appropriately enlarged, and the lengths of the major axes of the carbides are measured. The carbides are assumed to be elliptical or acicular to specify the major axes. Specifically, in three martensite blocks, the major axes of five carbides are measured from each of the three martensite blocks and averaged. The average is defined as the average particle size of carbides in tempered martensite.

The microhardness is measured using nanoindentation at a load of 100 μN at a ¼ thickness position on a polished sheet surface. The measurement is performed at five points in each of the bainite and martensite microstructures, and the average values are determined. The difference thereof is defined as the hardness difference. The maximum load is 500 μN, and a Berkovich indenter with an angle between opposite edges of 115 degrees is used.

Si Concentration in a Region within 100 μm in Thickness Direction from Steel Sheet Surface (Si Concentration in Surface Layer): 1.3% by Mass or Less In accordance with aspects of the present invention, a Si concentration in a region within 100 μm in the thickness direction from the steel sheet surface (Si concentration in the surface layer) is 1.3% or less. To obtain excellent resistance weldability, the Si concentration in a region within 100 μm from the steel sheet surface needs to be 1.3% by mass or less. Presumably, when the Si concentration is within this range, liquid metal embrittlement is unlikely to occur, and as a result, excellent resistance weldability is exhibited. The Si concentration in the surface layer is preferably 1.2% by mass or less, more preferably 1.1% by mass or less.

In accordance with aspects of the present invention, an L-section is used as an evaluation surface, and the Si concentration in a region within 100 μm in the thickness direction from the steel sheet surface is determined by performing analysis using a field emission-electron probe micro analyzer (FE-EPMA) at an electron beam diameter of 1 μm in a region of 100 μm×100 μm, extracting 10,000 points, and determining an average value of the top 10% of the concentrations.

The steel sheet according to aspects of the present invention may have a coated layer on a surface thereof. The type of coated layer is not particularly limited and may be either a Zn-coated layer (zinc-coated layer) or a coated layer of a metal other than Zn. The coated layer may contain a component other than a main component, main component being Zn or the like. The zinc-coated layer is, for example, a hot-dip galvanized layer or an electrogalvanized layer.

Next, a method for manufacturing a steel sheet according to aspects of the present invention will be described. The method for manufacturing a steel sheet according to aspects of the present invention includes a hot rolling step of hot-rolling a steel slab having the above chemical composition to obtain a hot-rolled steel sheet; a cold rolling step of, after the hot rolling step, cold-rolling the hot-rolled steel sheet to obtain a cold-rolled steel sheet; a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more, subsequently cooling the resulting steel sheet to a holding temperature of an Ms temperature or higher and (Ms+200° C.) or lower at a first average cooling rate of 5° C./s or more, holding the steel sheet at the holding temperature for a holding time of 1 second or more and 1,000 seconds or less, and cooling the steel sheet to a finish cooling temperature of 250° C. or lower at a second average cooling rate of 5° C./s or more; and an overaging treatment step of, after the continuous annealing step, holding the steel sheet in a temperature range of 150° C. or higher and 250° C. or lower for 30 seconds or more and 1,500 seconds or less.

Hot Rolling Step

Examples of a method for hot-rolling a steel slab include a method in which a slab is heated and then rolled, a method in which a slab after continuous casting is subjected to direct rolling without being heated, and a method in which a slab after continuous casting is subjected to heat treatment for a short time and then rolling. In the hot rolling, the average heating rate during slab heating may be 5 to 15° C./min, the finish rolling temperature FT may be 840° C. to 950° C., and the coiling temperature CT may be 400° C. to 700° C., as in the usual method.

In order to remove primary scale and secondary scale formed on the surface of the steel sheet, descaling may be performed as appropriate. It is preferable to sufficiently pickle the hot rolled coil before cold rolling to reduce the amount of remaining scale. From the viewpoint of reducing the load required for cold rolling, the hot-rolled steel sheet may be subjected to annealing, as needed.

Cold Rolling Step

When the rolling reduction in the cold rolling (cold rolling reduction) is 40% or more, the recrystallization behavior and the orientation of the texture in the subsequent continuous annealing can be stabilized. When the rolling reduction is less than 40%, some of austenite grains during annealing may be coarsened, which may result in a decrease in strength.

Continuous Annealing Step

The steel sheet after cold rolling is subjected to annealing and tempering treatment in a continuous annealing line (CAL).

In accordance with aspects of the present invention, to obtain predetermined martensite and bainite, the annealing temperature needs to be the $Ac_3$ temperature or higher, and the soaking time needs to be 15 seconds or more. When the annealing temperature is lower than the $Ac_3$ temperature or the soaking time is less than 15 seconds, austenite is not sufficiently formed during annealing. Thus, in the final product, predetermined martensite and/or bainite is not obtained and a tensile strength of 1,470 MPa or more is not achieved. The upper limits of the annealing temperature and the soaking time are not particularly limited. However, when the annealing temperature or the soaking time is at a certain level or higher, the austenite grain size may be coarsened, and delayed fracture resistance may deteriorate. Accordingly, the annealing temperature is preferably 950° C. or lower, and the soaking time is preferably 900 seconds or less.

In accordance with aspects of the present invention, the dew-point temperature of the atmosphere in the annealing is −60° C. or higher and −20° C. or lower. At a dew-point temperature of −60° C. or higher and −20° C. or lower, the Si concentration in the surface layer of the steel sheet can be 1.3% by mass or less to obtain excellent LME resistance. At a dew-point temperature of lower than −60° C., the equipment cost and the manufacturing cost may be increased. In addition, the Si concentration in the surface layer of the steel sheet cannot be 1.3% by mass or less, and desired delayed fracture resistance and LME resistance are not obtained. On the other hand, at a dew-point temperature of higher than −20° C., a decarbonization phenomenon in the surface layer may be promoted, the strength may decrease, and it may be impossible to achieve a strength of 1,470 MPa. Desired delayed fracture resistance is also not obtained.

For this reason, in accordance with aspects of the present invention, the annealing is performed in an atmosphere with a dew-point temperature of −60° C. or higher and −20° C. or lower. Preferably, the dew-point temperature is −55° C. or higher. Preferably, the dew-point temperature is −25° C. or lower.

Subsequently, to reduce the amount of ferrite, the resulting steel sheet needs to be cooled to a holding temperature of the Ms temperature or higher and (Ms temperature+200° C.) or lower at a first average cooling rate of 5° C./s or more. A first average cooling rate of less than 5° C./s results in the formation of a large amount of ferrite. Accordingly, the first average cooling rate is 5° C./s or more, preferably 7° C./s or more, more preferably 10° C./s or more.

Subsequently, to obtain predetermined bainite, isothermal holding at a holding temperature of (Ms temperature+200° C.) or lower and the Ms temperature or higher is necessary for 1 second or more and 1,000 seconds or less. A holding temperature of higher than (Ms temperature+200° C.) results in a failure to obtain retained austenite or results in the formation of a large amount of ferrite. On the other hand, a holding temperature of lower than the Ms temperature results in the formation of martensite tempered at a temperature higher than 250° C. (self-tempered martensite) during isothermal holding, and significant coarsening of carbides in grains and at block grain boundaries, which may result in a deterioration of delayed fracture resistance. The holding temperature is preferably (Ms temperature+20° C.) or higher, more preferably (Ms temperature+30° C.) or higher. The lower the holding temperature, the more likely retained austenite is obtained. Thus, the holding temperature is preferably (Ms temperature+150° C.) or lower, more preferably (Ms temperature+100° C.) or lower.

When the holding time is shorter than 1 second, the amounts of bainite and retained austenite are small, resulting in a problem of a deterioration of formability. Accordingly, the holding time is 1 second or more, preferably 15 seconds or more, more preferably 30 seconds or more. On the other hand, when the holding time is longer than 1,000 seconds, the amount of martensite decreases, resulting in a problem that a tensile strength of 1,470 MPa or more is not achieved. Accordingly, the holding time is 1,000 seconds or less, preferably 500 seconds or less, more preferably 300 seconds or less.

Subsequently, to obtain tempered martensite excellent in delayed fracture resistance, the steel sheet needs to be cooled to a finish cooling temperature of 250° C. or lower at a second average cooling rate of 5° C./s or more. When the finish cooling temperature exceeds 250° C. or the second average cooling rate is less than 5° C./s, self-tempered martensite containing coarse carbides in grains is formed, and delayed fracture resistance may deteriorate. Accordingly, in accordance with aspects of the present invention, cooling is performed to a finish cooling temperature of 250° C. or lower at a second average cooling rate of 5° C./s or more. The second average cooling rate is preferably 50° C./s or more, more preferably 100° C./s or more. The finish cooling temperature is preferably 150° C. or lower, more preferably 50° C. or lower.

Overaging Treatment Step

Tempered martensite contains a carbide formed during holding in a low temperature range after quenching and needs to be appropriately controlled in order to ensure delayed fracture resistance and TS≥1,470 MPa. Specifically, the temperature at which the steel sheet is reheated and held after quenching to 250° C. or lower or the holding temperature needs to be 150° C. or higher and 250° C. or lower, and the holding time needs to be controlled to 30 seconds or more and 1,500 seconds or less.

When the temperature is lower than 150° C. or the holding time is less than 30 seconds, the carbide distribution density may be insufficient, and toughness may deteriorate. On the other hand, when the temperature exceeds 250° C. or the holding time exceeds 1,500 seconds, carbides in grains and at block grain boundaries may be significantly coarsened, and delayed fracture resistance may deteriorate.

Coating Treatment Step

Before or after the overaging treatment step, the surface of the resulting steel sheet may be subjected to coating treatment. The coating treatment provides a steel sheet having a coated layer on the surface thereof. The type of coating treatment is not particularly limited and may be either coating using a technique of providing coating with a spray or electroplated coating. In the case of performing coating treatment, when the skin pass rolling is performed, the skin pass rolling is performed after the coating treatment.

The $Ac_3$ temperature and the Ms temperature are calculated from the following formulae (1) and (2) described in "The Physical Metallurgy of Steels, William C. Leslie" (Maruzen Co., Ltd., issued in 1985, p. 273 and p. 231). Note that [M %] represents the content (% by mass) of each element M.

$$Ac_3(° C.)=910-203\times[C\%]^{1/2}+44.7\times[Si\%]-30\times[Mn\%]+700\times[P\%]+130\times[Al\%]-15.2\times[Ni\%]-11\times[Cr\%]-20\times[Cu\%]+31.5\times[Mo\%]+104\times[V\%]+400\times[Ti\%] \quad (1)$$

$$Ms\ (° C.)=561-474\times[Co]-33\times[Mn\%]-17\times[Ni\%]-17\times[Cr\%]-21\times[Mo\%] \quad (2)$$

The steel sheet according to aspects of the present invention obtained by the manufacturing method described above preferably has a thickness of 0.5 mm or more. The thickness of the steel sheet is preferably 2.5 mm or less.

Next, a member according to aspects of the present invention and a method for manufacturing the member will be described.

The member according to aspects of the present invention is a member obtained by subjecting the steel sheet according to aspects of the present invention to at least one of forming and joining. The method for manufacturing a member according to aspects of the present invention includes a step of subjecting a steel sheet manufactured by the method for manufacturing a steel sheet according to aspects of the present invention to at least one of forming and joining.

The steel sheet according to aspects of the present invention has a tensile strength of 1,470 MPa or more and has excellent formability, delayed fracture resistance, and LME resistance. Accordingly, the member obtained using the steel sheet according to aspects of the present invention also has high strength and has higher formability, delayed fracture resistance, and LME resistance than existing high-strength members. Use of the member according to aspects of the present invention enables weight reduction. Thus, the member according to aspects of the present invention is suitable for use in, for example, members with complicated shapes used in the field of automobiles, such as vehicle frame parts.

For the forming, typical processing methods, such as press forming, can be used without limitation. The joining processing methods are also not particularly limited, and for example, typical welding, such as spot welding, laser welding, and arc welding, riveting, and caulking can be used. The forming conditions and joining conditions are not particularly limited, and usual methods may be employed.

EXAMPLES

Example 1

Examples of the present invention will be described below.

Cold-rolled steel sheets having chemical compositions shown in Table 1 and having a thickness of 1.2 mm were subjected to heat treatment under the annealing conditions and overaging treatment conditions shown in Table 2.

The soaking time at the annealing temperature was 300 seconds. Regarding No. 20, after the overaging treatment, the steel sheet surface was subjected to coating treatment. The conditions for the coating treatment were those for electrogalvanizing.

The cold-rolled steel sheets were obtained by subjecting steel slabs having chemical compositions shown in Table 1 to hot rolling (average heating rate during heating: 10° C./min, finish rolling temperature FT: 900° C., and coiling temperature CT: 500° C.) and subsequent cold rolling (rolling reduction: 55%).

TABLE 1

| Steel No. | Chemical composition (mass %) | | | | | | | | Ms temperature (° C.) | $Ac_3$ temperature (° C.) | Remarks |
|---|---|---|---|---|---|---|---|---|---|---|---|
| | C | Si | Mn | P | S | sol.Al | N | others | | | |
| A | 0.25 | 0.7 | 2.4 | 0.006 | 0.0009 | 0.026 | 0.0029 | — | 363 | 775 | Conforming steel |
| B | 0.39 | 0.8 | 3.0 | 0.006 | 0.0010 | 0.044 | 0.0028 | — | 277 | 739 | Conforming steel |
| C | 0.29 | 0.3 | 2.4 | 0.005 | 0.0004 | 0.025 | 0.0050 | — | 344 | 749 | Conforming steel |
| D | 0.26 | 0.9 | 2.6 | 0.006 | 0.0014 | 0.038 | 0.0033 | — | 352 | 778 | Conforming steel |
| E | 0.27 | 0.7 | 1.6 | 0.007 | 0.0008 | 0.037 | 0.0045 | — | 380 | 798 | Conforming steel |
| F | 0.27 | 0.4 | 3.4 | 0.005 | 0.0006 | 0.021 | 0.0046 | — | 321 | 727 | Conforming steel |
| G | 0.26 | 0.7 | 2.4 | 0.009 | 0.0003 | 0.039 | 0.0051 | — | 359 | 777 | Conforming steel |
| H | 0.37 | 0.6 | 2.7 | 0.005 | 0.0019 | 0.034 | 0.0045 | — | 297 | 740 | Conforming steel |
| I | 0.30 | 0.4 | 2.4 | 0.004 | 0.0008 | 0.400 | 0.0041 | — | 340 | 799 | Conforming steel |

TABLE 1-continued

| Steel No. | Chemical composition (mass %) | | | | | | | Ms temperature (° C.) | Ac₃ temperature (° C.) | Remarks |
|---|---|---|---|---|---|---|---|---|---|---|
| | C | Si | Mn | P | S | sol.Al | N | others | | |
| J | 0.29 | 0.4 | 2.5 | 0.006 | 0.0005 | 0.054 | 0.0041 | Cu: 0.16 | 341 | 752 | Conforming steel |
| K | 0.31 | 0.5 | 2.7 | 0.006 | 0.0006 | 0.041 | 0.0037 | Cu: 0.10, Nb: 0.040 | 325 | 746 | Conforming steel |
| L | 0.34 | 0.6 | 2.5 | 0.008 | 0.0008 | 0.036 | 0.0029 | Ti: 0.020, B: 0.0020, V: 0.002 | 317 | 762 | Conforming steel |
| M | 0.29 | 0.7 | 1.8 | 0.006 | 0.0010 | 0.040 | 0.0035 | Cr: 0.40, V: 0.004, Zr: 0.003 | 357 | 783 | Conforming steel |
| N | 0.33 | 0.4 | 3.4 | 0.005 | 0.0011 | 0.029 | 0.0046 | V: 0.020, W: 0.005 | 292 | 719 | Conforming steel |
| O | 0.25 | 0.5 | 2.8 | 0.006 | 0.0008 | 0.026 | 0.0040 | Ni: 0.01, Sb: 0.007 | 350 | 754 | Conforming steel |
| P | 0.35 | 0.4 | 2.9 | 0.007 | 0.0006 | 0.03 | 0.0030 | Sb 0.009, Sn: 0.010 | 299 | 730 | Conforming steel |
| Q | 0.31 | 0.4 | 3.0 | 0.006 | 0.0007 | 0.031 | 0.0023 | Ca: 0.0040, Mg: 0.0008 | 315 | 733 | Conforming steel |
| R | 0.28 | 0.6 | 2.4 | 0.005 | 0.0005 | 0.035 | 0.0043 | Mg: 0.0004, REM: 0.0004 | 349 | 765 | Conforming steel |
| S | 0.27 | 0.4 | 2.6 | 0.004 | 0.0005 | 0.032 | 0.0039 | Mo: 0.03, Cr: 0.02, Sb: 0.020 | 346 | 752 | Conforming steel |
| T | 0.26 | 0.6 | 2.4 | 0.007 | 0.0010 | 0.041 | 0.0050 | — | 359 | 772 | Conforming steel |
| U | 0.23 | 0.4 | 2.8 | 0.008 | 0.0010 | 0.032 | 0.0039 | — | 360 | 756 | Comparative steel |
| V | 0.42 | 0.4 | 3.1 | 0.008 | 0.0010 | 0.017 | 0.0052 | — | 260 | 711 | Comparative steel |
| W | 0.29 | 0.1 | 2.7 | 0.006 | 0.0012 | 0.052 | 0.0040 | — | 334 | 735 | Comparative steel |
| X | 0.27 | 1.1 | 2.2 | 0.009 | 0.0011 | 0.041 | 0.0034 | — | 360 | 799 | Comparative steel |
| Y | 0.29 | 0.6 | 1.4 | 0.006 | 0.0016 | 0.031 | 0.0034 | — | 377 | 794 | Comparative steel |
| Z | 0.27 | 0.4 | 3.6 | 0.006 | 0.0011 | 0.040 | 0.0040 | — | 314 | 724 | Comparative steel |
| AA | 0.28 | 0.5 | 2.6 | 0.011 | 0.0011 | 0.048 | 0.0052 | — | 342 | 761 | Comparative steel |
| AB | 0.33 | 0.4 | 2.4 | 0.006 | 0.0023 | 0.043 | 0.0051 | — | 325 | 749 | Comparative steel |

The balance other than the above is Fe and incidental impurities.

TABLE 2

| No. | Steel No. | Annealing conditions | | | | | | | | Overaging treatment conditions | | Remarks |
|---|---|---|---|---|---|---|---|---|---|---|---|---|
| | | Ac₃ temperature (° C.) | Annealing temperature (° C.) | Dew-point temperature (° C.) | First average cooling rate (° C./s) | Ms temperature (° C.) | Holding temperature (° C.) | Holding time (s) | Second average cooling rate (° C./s) | Finish cooling temperature (° C.) | Holding temperature (° C.) | Holding time (s) | |
| 1 | A | 775 | 860 | −45 | 12 | 363 | 500 | 170 | 427 | 180 | 210 | 690 | Conforming steel |
| 2 | B | 739 | 890 | −48 | 16 | 277 | 410 | 180 | 387 | 120 | 190 | 800 | Conforming steel |
| 3 | C | 749 | 880 | −48 | 14 | 344 | 460 | 120 | 540 | 55 | 180 | 740 | Conforming steel |
| 4 | D | 778 | 890 | −36 | 16 | 352 | 400 | 150 | 320 | 160 | 190 | 680 | Conforming steel |
| 5 | E | 798 | 870 | −41 | 15 | 380 | 410 | 140 | 508 | 29 | 209 | 880 | Conforming steel |
| 6 | F | 727 | 870 | −36 | 12 | 321 | 520 | 100 | 627 | 50 | 194 | 900 | Conforming steel |
| 7 | G | 777 | 840 | −27 | 12 | 359 | 480 | 140 | 560 | 60 | 189 | 780 | Conforming steel |
| 8 | H | 740 | 890 | −34 | 14 | 297 | 480 | 120 | 523 | 88 | 209 | 960 | Conforming steel |
| 9 | I | 799 | 920 | −39 | 17 | 340 | 420 | 100 | 499 | 46 | 198 | 880 | Conforming steel |

TABLE 2-continued

| | | Annealing conditions | | | | | | | Overaging treatment | | |
| | | | First | | | | | Second | Finish | conditions | |
| No. | Steel No. | $Ac_3$ temperature (°C.) | Annealing temperature (°C.) | Dew-point temperature (°C.) | average cooling rate (°C./s) | Ms temperature (°C.) | Holding temperature (°C.) | Holding time (s) | average cooling rate (°C./s) | cooling temperature (°C.) | Holding temperature (°C.) | Holding time (s) | Remarks |
|---|---|---|---|---|---|---|---|---|---|---|---|---|---|
| 10 | J | 752 | 900 | −46 | 17 | 341 | 400 | 80 | 373 | 120 | 197 | 720 | Conforming steel |
| 11 | K | 746 | 870 | −42 | 16 | 325 | 380 | 160 | 375 | 99 | 210 | 900 | Conforming steel |
| 12 | L | 762 | 900 | −51 | 16 | 317 | 430 | 60 | 537 | 27 | 203 | 820 | Conforming steel |
| 13 | M | 783 | 900 | −54 | 18 | 357 | 370 | 150 | 464 | 22 | 240 | 900 | Conforming steel |
| 14 | N | 719 | 880 | −48 | 14 | 292 | 450 | 190 | 567 | 25 | 204 | 770 | Conforming steel |
| 15 | O | 754 | 860 | −45 | 15 | 350 | 400 | 300 | 347 | 140 | 194 | 720 | Conforming steel |
| 16 | P | 730 | 880 | −37 | 16 | 299 | 410 | 160 | 513 | 25 | 170 | 580 | Conforming steel |
| 17 | Q | 733 | 870 | −34 | 16 | 315 | 390 | 140 | 485 | 26 | 210 | 820 | Conforming steel |
| 18 | R | 765 | 900 | −46 | 18 | 349 | 370 | 170 | 347 | 110 | 230 | 780 | Conforming steel |
| 19 | S | 752 | 880 | −31 | 14 | 346 | 460 | 160 | 572 | 31 | 190 | 690 | Conforming steel |
| 20 | T | 772 | 890 | −48 | 15 | 359 | 450 | 180 | 563 | 28 | 188 | 840 | Conforming steel |
| 21 | U | 756 | 850 | −51 | 12 | 360 | 500 | 140 | 632 | 26 | 234 | 850 | Comparative steel |
| 22 | V | 711 | 860 | −54 | 15 | 260 | 400 | 190 | 501 | 24 | 209 | 600 | Comparative steel |
| 23 | W | 735 | 840 | −44 | 14 | 334 | 420 | 140 | 517 | 32 | 170 | 600 | Comparative steel |
| 24 | X | 799 | 870 | −42 | 15 | 360 | 410 | 190 | 500 | 35 | 198 | 650 | Comparative steel |
| 25 | Y | 779 | 890 | −48 | 16 | 377 | 400 | 180 | 492 | 31 | 187 | 840 | Comparative steel |
| 26 | Z | 724 | 880 | −46 | 16 | 314 | 410 | 120 | 500 | 35 | 198 | 840 | Comparative steel |
| 27 | AA | 761 | 850 | −42 | 12 | 342 | 480 | 160 | 608 | 24 | 170 | 600 | Comparative steel |
| 28 | AB | 749 | 880 | −34 | 16 | 325 | 400 | 190 | 492 | 31 | 204 | 600 | Comparative steel |
| 29 | G | 777 | 765 | −38 | 10 | 359 | 480 | 140 | 427 | 160 | 189 | 600 | Comparative steel |
| 30 | G | 777 | 890 | −70 | 15 | 359 | 450 | 120 | 561 | 29 | 211 | 600 | Comparative steel |
| 31 | G | 777 | 840 | −15 | 13 | 359 | 460 | 160 | 507 | 80 | 197 | 600 | Comparative steel |
| 32 | G | 777 | 840 | −40 | 2 | 359 | 500 | 160 | 632 | 26 | 210 | 800 | Comparative steel |
| 33 | G | 777 | 860 | −37 | 8 | 359 | 610 | 140 | 667 | 110 | 209 | 800 | Comparative steel |
| 34 | G | 777 | 860 | −51 | 17 | 359 | 330 | 180 | 405 | 26 | 170 | 960 | Comparative steel |
| 35 | H | 740 | 870 | −44 | 15 | 297 | 400 | 0.3 | 499 | 26 | 180 | 960 | Comparative steel |
| 36 | H | 740 | 870 | −34 | 15 | 297 | 420 | 1100 | 517 | 32 | 204 | 960 | Comparative steel |
| 37 | H | 740 | 870 | −37 | 15 | 297 | 430 | 170 | 7 | 180 | 215 | 600 | Conforming steel |
| 38 | H | 740 | 870 | −40 | 15 | 297 | 430 | 200 | 2 | 160 | 198 | 600 | Comparative steel |
| 39 | H | 740 | 870 | −49 | 15 | 297 | 420 | 210 | 213 | 260 | 205 | 600 | Comparative steel |
| 40 | H | 740 | 870 | −35 | 13 | 297 | 480 | 170 | 320 | 240 | 210 | 600 | Conforming steel |
| 41 | H | 740 | 870 | −37 | 14 | 297 | 460 | 160 | 581 | 24 | 260 | 600 | Comparative steel |
| 42 | H | 740 | 860 | −48 | 14 | 297 | 440 | 140 | 551 | 27 | 151 | 600 | Conforming steel |
| 43 | H | 740 | 880 | −45 | 14 | 297 | 430 | 100 | 440 | 100 | 220 | 1560 | Comparative steel |

For each of the resulting steel sheets, the metallic microstructure was quantified, and a tensile test and a delayed fracture resistance evaluation test were further performed.

The metallic microstructure was quantified by polishing an L-section (a section parallel to the rolling direction and perpendicular to the steel sheet surface) of the steel sheet, then etching the section in nital, observing the section at a ¼ thickness position from the steel sheet surface with a SEM at a magnification of 2,000× in four fields of view, and subjecting a captured microstructure image to image analysis. Here, martensite is a microstructure that appears gray in SEM. In the martensite, tempered martensite is a microstructure containing fine carbides in martensite.

On the other hand, bainite and ferrite are regions that appear a black contrast in SEM. Although martensite and bainite include trace amounts of carbides, nitrides, sulfides, and oxides inside thereof, it is difficult to exclude them, and thus area fractions of regions that include these were measured as the area fractions of martensite and bainite.

In the metallic microstructure observed, ferrite is a microstructure that is formed by transformation from austenite at a relatively high temperature and composed of grains with a bcc lattice. Bainite is a microstructure that is formed from austenite at a relatively low temperature (equal to or higher than the martensite transformation temperature) and that contains spherical carbides dispersed in lath- or plate-shaped ferrite. Pearlite is a microstructure in which cementite is precipitated in ferrite in a lamellar form.

Regarding the measurement of retained austenite, a surface layer of the steel sheet was subjected to chemical polishing with oxalic acid to a depth of ¼ thickness, and the surface of the sheet was analyzed by an X-ray diffraction intensity method. Calculations were made using integral intensities of peaks of $(200)\alpha$, $(211)\alpha$, $(220)\alpha$, $(200)\gamma$, $(220)\gamma$, and $(311)\gamma$ diffraction planes measured with Mo—$K_\alpha$ radiation.

The area fraction of retained austenite determined as described above was subtracted from 100%, and the residual area fraction was distributed in the proportion of martensite, bainite, ferrite, and pearlite determined by the observation of the microstructure image obtained with the SEM using a point counting method. Thus, the area fractions of martensite, bainite, ferrite, pearlite, and retained austenite were specified.

The average amount of C in retained austenite was determined by calculating a lattice constant ($\alpha_\gamma$) of γ from a {220} peak angle of γ using a Co—$K_\alpha$ radiation source, and substituting the amounts of alloying elements contained into the following formula.

$$\alpha_\gamma = 3.578 + 0.00095(\% \text{ Mn}) + 0.022(\% \text{ N}) + 0.0056(\% \text{ Al}) + 0.033(\% \text{ C})$$

In the formula, (% Mn), (% N), and (% Al) are the contents (% by mass) of Mn, N, and Al, respectively. (% C) is the average amount of C (% by mass) in retained austenite.

In quantification of the sizes of carbides in tempered martensite in martensite, an L-section (a vertical section parallel to the rolling direction) of the steel sheet was polished and then etched in nital, and the section was observed at a ¼ thickness position from the steel sheet surface with a SEM at a magnification of 10,000× in two fields of view. In the observation image, white particles that were finely dispersed in the tempered martensite microstructure were regarded as carbides and appropriately enlarged, and the lengths of the major axes of the carbides were measured. The carbides are assumed to be elliptical or acicular to specify the major axes. Specifically, in three martensite blocks, the major axes of five carbides were measured from each of the three martensite blocks and averaged. The average was defined as the average particle size of carbides in tempered martensite.

In the tensile test, a JIS No. 5 test piece for tensile test was cut out such that the rolling direction was the longitudinal direction, and a tensile test (in accordance with JIS 22241) was performed to evaluate TS and El.

The microhardness was measured using nanoindentation at a load of 100 μN at a ¼ thickness position on a polished sheet surface. The measurement was performed at five points in each of the bainite and martensite microstructures, and the average values were determined. The difference thereof was defined as the hardness difference. A triboindenter manufactured by Hysitron, Inc. was used as an indentation device, the maximum load was 500 μN, and a Berkovich indenter with an angle between opposite edges of 115 degrees was used.

Regarding the Si concentration in a region within 100 μm in the thickness direction from the steel sheet surface (Si concentration in the surface layer), an L-section was used as an evaluation surface. Specifically, the analysis was performed using a field emission-electron probe micro analyzer (FE-EPMA) at an electron beam diameter of 1 μm in a region of 100 μm×100 μm, 10,000 points were extracted, and an average value of the top 10% of the concentrations was determined.

In the evaluation of delayed fracture resistance of the steel sheet, delayed fracture of the base material of the steel sheet was evaluated.

The evaluation of delayed fracture of the base material of the steel sheet was performed by taking a strip test specimen from the obtained steel sheet at a position ¼ of the width of the coil so as to have a size of 30 mm in a rolling direction and a size of 100 mm in a direction perpendicular to the rolling direction. Edge surfaces of the test specimen having a length of 100 mm were formed by shearing. The test specimen was subjected to bending directly subsequent to shearing (without being subjected to machining to remove burrs) such that the burrs were located on the outer peripheral side of bending. The test specimen was fixed with bolts so as to maintain the shape of the test specimen during the bend forming. In the shearing, the clearance was set to 15%, and the rake angle was set to 0 degree. The bending was performed with a bend radius that satisfied R/t=4, where R represents a tip bend radius and t represents a sheet thickness (where the sheet thickness t was 1.2 mm, and the bend forming was performed with a punch having a punch tip radius of 5.0 mm) such that the inside angle of the tip was 90 degrees (V-bend). The punch used was a U-shaped punch having a tip with the above radius (a punch including a semicircular tip R portion and a body having a thickness of 2R). A die having a corner R of 30 mm was used. The depth the punch was pressed against the steel sheet was adjusted to form the steel sheet such that the bending angle of the tip was 90 degrees (V-shape). The test specimen was pinched and fastened using a hydraulic jack such that the distance between flange ends of straight portions of the test specimen having been subjected to the bend forming was equal to that of the test specimen during the bend forming (such that a gap between the straight portions due to springback was cancelled out) and then fastened with bolts in this state. The bolts were fixed so as to penetrate through holes having an elliptical shape (minor axis: 10 mm, major axis: 15 mm) and formed in advance in the strip test specimen at positions 10 mm inside from the respective short-side edges. The resulting test specimen fastened with the bolts was immersed in one liter or more per test specimen of hydrochloric acid (an aqueous hydrogen chloride solution) having a pH of 3, and a test was performed at an aqueous solution temperature of 25° C. while the pH was controlled to be constant. The presence or absence of microcracks (initial state of delayed fracture) that could be visually observed (having a length of 1 mm or more) was constantly examined visually or using a camera. The time taken from the start of the immersion until the start of the formation of microcracks was measured as a delayed-fracture time, and the measurement was conducted up to a maximum of 96 hours.

With an increase in strength of steel sheets, a concern about delayed fractures increases. Thus, even among high strength steel sheets, there is a difference in delayed fracture property. When the fracture time was $10H° ° ° 55'$ (TS−1760)+0.3) hours (10 to the power of (−0.0055×(TS−1760)+ 0.3) hours) or more, the steel sheet was considered to be excellent in the delayed fracture property and evaluated as "o" (pass). When the fracture time was less than the above value, the steel sheet was evaluated as "x" (fail).

The LME resistance was determined by a resistance welding cracking test. One test specimen prepared by cutting the obtained steel sheet to 30 mm×100 mm such that a direction perpendicular to the rolling direction was the longitudinal direction, and another test specimen made of a 980 MPa-grade hot-dip galvanized steel sheet were used to perform resistance welding (spot welding). A sheet set of two steel sheets stacked on top of each other was subjected to resistance spot welding using a servomotor pressure-type single-phase alternating current (50 Hz) resistance welding machine attached to a welding gun, while the sheet set was tilted by 5°. The welding conditions were a welding pressure of 3.8 kN and a holding time of 0.2 seconds. The welding current was 5.7 to 6.2 kA, the current application time was 21 cycles, and the holding time was 5 cycles. After welding, the test specimen was cut in half, and a cross section was observed with an optical microscope. When no crack of 0.1 mm or more was observed, the LME cracking property was evaluated to be good (○). When a crack of 0.1 mm or more was observed, the LME cracking property was evaluated to be poor (x).

TABLE 3

| No. | Steel No. | Microstructure Area fraction of bainite (%) | Area fraction of ferrite and pearlite (%) | Area fraction of martensite (%) | Area fraction of retained γ (%) | Amount of C in retained γ (mass %) (*1) | Carbide size (μm) (*2) | Si concentration in surface layer (mass %) (*3) | Hardness difference (GPa) (*4) | Tensile strength (MPa) | Elongation (%) | Delayed fracture resistance | LME resistance | Remarks |
|---|---|---|---|---|---|---|---|---|---|---|---|---|---|---|
| 1 | A | 46 | 0 | 49 | 5 | 1.2 | 0.18 | 1.1 | 2.3 | 1544 | 13 | ○ | ○ | Conforming steel |
| 2 | B | 40 | 0 | 44 | 16 | 0.9 | 0.11 | 1.2 | 1.7 | 1675 | 20 | ○ | ○ | Conforming steel |
| 3 | C | 30 | 0 | 66 | 4 | 0.9 | 0.09 | 0.7 | 2.0 | 1624 | 11 | ○ | ○ | Conforming steel |
| 4 | D | 32 | 0 | 62 | 6 | 0.9 | 0.08 | 1.2 | 1.7 | 1618 | 13 | ○ | ○ | Conforming steel |
| 5 | E | 31 | 0 | 67 | 2 | 0.6 | 0.16 | 1.1 | 1.7 | 1592 | 11 | ○ | ○ | Conforming steel |
| 6 | F | 27 | 0 | 70 | 3 | 0.6 | 0.13 | 0.7 | 2.4 | 1691 | 11 | ○ | ○ | Conforming steel |
| 7 | G | 36 | 0 | 59 | 5 | 1.2 | 0.09 | 0.9 | 2.1 | 1607 | 13 | ○ | ○ | Conforming steel |
| 8 | H | 31 | 0 | 62 | 7 | 1.1 | 0.19 | 0.9 | 2.1 | 1787 | 14 | ○ | ○ | Conforming steel |
| 9 | I | 22 | 0 | 73 | 5 | 0.8 | 0.15 | 0.7 | 1.8 | 1647 | 11 | ○ | ○ | Conforming steel |
| 10 | J | 22 | 0 | 73 | 5 | 0.7 | 0.14 | 0.8 | 1.7 | 1638 | 11 | ○ | ○ | Conforming steel |
| 11 | K | 32 | 0 | 61 | 7 | 0.6 | 0.19 | 0.9 | 1.6 | 1650 | 13 | ○ | ○ | Conforming steel |
| 12 | L | 21 | 0 | 74 | 5 | 0.9 | 0.16 | 1.0 | 1.9 | 1772 | 12 | ○ | ○ | Conforming steel |
| 13 | M | 30 | 0 | 67 | 3 | 0.5 | 0.27 | 1.2 | 1.3 | 1604 | 11 | ○ | ○ | Conforming steel |
| 14 | N | 46 | 0 | 44 | 10 | 0.9 | 0.18 | 0.8 | 2.0 | 1643 | 16 | ○ | ○ | Conforming steel |
| 15 | O | 50 | 0 | 42 | 8 | 0.7 | 0.12 | 0.9 | 1.7 | 1502 | 14 | ○ | ○ | Conforming steel |
| 16 | P | 35 | 0 | 57 | 8 | 0.7 | 0.06 | 0.7 | 1.7 | 1731 | 14 | ○ | ○ | Conforming steel |
| 17 | Q | 29 | 0 | 63 | 8 | 0.6 | 0.19 | 0.7 | 1.6 | 1649 | 13 | ○ | ○ | Conforming steel |
| 18 | R | 34 | 0 | 61 | 5 | 0.6 | 0.24 | 1.0 | 1.5 | 1571 | 12 | ○ | ○ | Conforming steel |
| 19 | S | 39 | 0 | 55 | 6 | 0.9 | 0.11 | 0.7 | 2.0 | 1556 | 13 | ○ | ○ | Conforming steel |
| 20 | T | 44 | 0 | 51 | 5 | 1.0 | 0.16 | 1.0 | 2.0 | 1551 | 13 | ○ | ○ | Conforming steel |
| 21 | U | 37 | 0 | 57 | 6 | 1.1 | 0.26 | 0.9 | 2.3 | 1471 | 13 | x | ○ | Comparative steel |
| 22 | V | 41 | 0 | 49 | 10 | 0.7 | 0.21 | 0.9 | 1.7 | 1802 | 11 | x | ○ | Comparative steel |

TABLE 3-continued

| No. | Steel No. | Area fraction of bainite (%) | Area fraction of ferrite and pearlite (%) | Area fraction of martensite (%) | Area fraction of retained γ (%) | Amount of C in retained γ (mass %) (*1) | Carbide size (μm) (*2) | Si concentration in surface layer (mass %) (*3) | Hardness difference (GPa) (*4) | Tensile strength (MPa) | Elongation (%) | Delayed fracture resistance | LME resistance | Remarks |
|---|---|---|---|---|---|---|---|---|---|---|---|---|---|---|
| 23 | W | 32 | 0 | 67 | 1 | 0.4 | 0.41 | 0.5 | 1.8 | 1693 | 9 | x | o | Comparative steel |
| 24 | X | 42 | 0 | 53 | 5 | 1.0 | 0.09 | 1.5 | 1.7 | 1644 | 13 | o | x | Comparative steel |
| 25 | Y | 39 | 13 | 47 | 1 | 0.7 | 0.21 | 1.0 | 1.7 | 1370 | 13 | o | o | Comparative steel |
| 26 | Z | 26 | 0 | 64 | 10 | 0.7 | 0.14 | 0.8 | 1.7 | 1582 | 14 | x | o | Comparative steel |
| 27 | AA | 41 | 0 | 53 | 6 | 1.1 | 0.04 | 0.9 | 2.1 | 1611 | 13 | x | o | Comparative steel |
| 28 | AB | 40 | 0 | 54 | 6 | 0.7 | 0.18 | 0.7 | 1.7 | 1642 | 13 | x | o | Comparative steel |
| 29 | G | 36 | 18 | 41 | 5 | 1.2 | 0.09 | 1.0 | 2.1 | 1324 | 18 | o | o | Comparative steel |
| 30 | G | 29 | 0 | 66 | 5 | 1.0 | 0.17 | 1.4 | 2.0 | 1604 | 12 | x | x | Comparative steel |
| 31 | G | 40 | 10 | 45 | 5 | 1.1 | 0.12 | 0.8 | 2.0 | 1430 | 16 | x | o | Comparative steel |
| 32 | G | 43 | 12 | 40 | 5 | 1.2 | 0.16 | 1.0 | 2.3 | 1366 | 17 | x | o | Comparative steel |
| 33 | G | 46 | 20 | 29 | 5 | 1.8 | 0.16 | 1.0 | 2.9 | 1239 | 14 | o | o | Comparative steel |
| 34 | G | 31 | 0 | 63 | 6 | 0.5 | 0.42 | 1.1 | 1.3 | 1642 | 10 | x | o | Comparative steel |
| 35 | H | 0 | 0 | 100 | 0 | — | 0.06 | 1.1 | — | 1796 | 7 | o | o | Comparative steel |
| 36 | H | 89 | 0 | 0 | 11 | 0.8 | 0.14 | 1.0 | 1.8 | 1124 | 19 | x | o | Comparative steel |
| 37 | H | 40 | 0 | 54 | 6 | 0.9 | 0.35 | 0.9 | 1.9 | 1570 | 13 | o | o | Conforming steel |
| 38 | H | 46 | 0 | 45 | 9 | 0.9 | 0.44 | 0.9 | 1.9 | 1532 | 15 | x | o | Comparative steel |
| 39 | H | 47 | 0 | 44 | 9 | 0.8 | 0.41 | 1.0 | 1.8 | 1524 | 15 | x | o | Comparative steel |
| 40 | H | 44 | 0 | 48 | 8 | 1.1 | 0.35 | 0.9 | 2.1 | 1534 | 15 | o | o | Conforming steel |
| 41 | H | 40 | 0 | 53 | 7 | 1.0 | 0.42 | 0.9 | 2.0 | 1524 | 14 | x | o | Comparative steel |
| 42 | H | 33 | 0 | 63 | 4 | 0.9 | 0.17 | 1.0 | 1.9 | 1675 | 12 | o | o | Conforming steel |
| 43 | H | 22 | 0 | 71 | 7 | 0.9 | 0.46 | 1.0 | 1.9 | 1592 | 13 | x | o | Comparative steel |

(*1): Average amount of C in retained austenite (mass %)
(*2): Average particle size of carbides in tempered martensite in martensite (μm)
(*3): Si concentration in region within 100 μm in thickness direction from steel sheet surface (mass %)
(*4): Hardness difference in microhardness between bainite and the martensite (GPa)

The steels having appropriate chemical compositions and obtained under appropriate hot-rolling conditions and annealing conditions each have a TS of 1,470 MPa or more. Furthermore, 2% or more of retained austenite is obtained in terms of area fraction, the retained austenite having an average amount of C of 0.5% by mass or more, and an elongation of 11% or more is obtained.

Regarding the delayed fracture resistance of the base materials of the steel sheets, the fracture time is $10^{(-0.0055 \times (TS-1760)+0.3)}$ hours or more, and excellent properties for delayed fractures are obtained. The steel sheets according to aspects of the present invention have a tensile strength of 1,470 MPa or more and an elongation of 11% or more, have a feature that the fracture time is $10^{(-0.0055 \times (TS-1760)+0.3)}$ hours or more in the delayed fracture resistance evaluation test, and have excellent LME resistance. The steel sheets of Comparative Examples do not satisfy one of those conditions.

Example 2

A steel sheet manufactured under the manufacturing condition No. 1 (conforming steel) in Table 2 of Example 1 was subjected to galvanizing treatment to prepare a galvanized steel sheet, and the galvanized steel sheet was subjected to press forming to manufacture a member of the inventive example. Furthermore, a galvanized steel sheet manufactured by subjecting a steel sheet manufactured under the manufacturing condition No. 1 (conforming steel) in Table 2 of Example 1 to galvanizing treatment and a galvanized steel sheet manufactured by subjecting a steel sheet manufactured under the manufacturing condition No. 2 (conforming steel) in Table 2 of Example 1 to galvanizing treatment were joined together by spot welding to manufacture a member of the inventive example.

These members of the inventive examples have a tensile strength TS of 1,470 MPa or more and have excellent formability, delayed fracture resistance, and LME resistance. This demonstrates that these members are suitable for use in, for example, automotive parts.

Similarly, a steel sheet manufactured under the manufacturing condition No. 1 (conforming example) in Table 2 of Example 1 was subjected to press forming to manufacture a member of the inventive example. Furthermore, a steel sheet manufactured under the manufacturing condition No. 1 (conforming example) in Table 2 of Example 1 and a steel sheet manufactured under the manufacturing condition No. 2 (conforming example) in Table 2 of Example 1 were joined together by spot welding to manufacture a member of the inventive example. These members of the inventive examples have a tensile strength TS of 1,470 MPa or more and have excellent formability, delayed fracture resistance, and LME resistance. This demonstrates that these members are suitable for use in, for example, automotive parts.

INDUSTRIAL APPLICABILITY

According to aspects of the present invention, a high-strength steel sheet having excellent formability, delayed fracture resistance, and LME resistance is provided. This improvement in properties enables a high-strength steel sheet for cold press forming to be applied to parts that are difficult to form, and contributes to improvements in the strengths of parts and reductions in the weights of the parts.

The invention claimed is:

1. A steel sheet comprising:
a chemical composition containing, by mass %,
C: 0.24% or more and 0.40% or less,
Si: 0.2% or more and 1.0% or less,
Mn: 1.5% or more and 3.5% or less,
P: 0.002% or more and 0.010% or less,
S: 0.0002% or more and 0.0020% or less,
sol. Al: 0.50% or less (not including 0%), and
N: 0.0006% or more and 0.01% or less,
with the balance being Fe and incidental impurities;
a steel microstructure containing, in area fraction, martensite: 40% or more and 78% or less, bainite: 20% or more and 58% or less, and retained austenite: 2% or more,
wherein carbides in tempered martensite in the martensite have an average particle size of 0.40 μm or less,
an average amount of C in the retained austenite is 0.5% by mass or more,
a Si concentration in a region within 100 μm in a thickness direction from a surface of the steel sheet is 1.3% by mass or less; and
optionally a coated layer on a surface of the steel sheet, and
a tensile strength is 1,470 MPa or more.

2. The steel sheet according to claim 1, wherein the chemical composition further contains, by mass %, at least one of following (A) to (D);
(A) one or two or more selected from:
Nb: 0.1% or less,
Ti: 0.10% or less,
B: 0.0050% or less,
Cu: 1% or less, and
Ni: 1% or less,
(B) one or two or more selected from:
Cr: 1.0% or less,
Mo: less than 0.3%,
V: 0.45% or less,
Zr: 0.2% or less, and
W: 0.2% or less,
(c) one or two selected from:
Sb: 0.1% or less, and
Sn: 0.1% or less,
(D) one or two or more selected from:
Ca: 0.0050% or less,
Mg: 0.01% or less, and
REM: 0.01% or less.

3. The steel sheet according to claim 1, wherein a hardness difference in microhardness between the bainite and the martensite is 1.5 GPa or more.

4. The steel sheet according to claim 2, wherein a hardness difference in microhardness between the bainite and the martensite is 1.5 GPa or more.

5. A member obtained by subjecting the steel sheet according to claim 1 to at least one of forming and joining.

6. A member obtained by subjecting the steel sheet according to claim 2 to at least one of forming and joining.

7. A member obtained by subjecting the steel sheet according to claim 3 to at least one of forming and joining.

8. A member obtained by subjecting the steel sheet according to claim 4 to at least one of forming and joining.

9. A method for manufacturing a steel sheet, the method being a method for manufacturing the steel sheet according to claim 1, the method comprising:
a hot rolling step of hot-rolling a steel slab to obtain a hot-rolled steel sheet;
a cold rolling step of, after the hot rolling step, cold-rolling the hot-rolled steel sheet to obtain a cold-rolled steel sheet;
a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more,
subsequently cooling the resulting steel sheet to a holding temperature of an Ms temperature or higher and (Ms temperature+200° C.) or lower at a first average cooling rate of 5° C./s or more, holding the steel sheet at the holding temperature for a holding time of 1 second or more and 1,000 seconds or less, and
cooling the steel sheet to a finish cooling temperature of 250° C. or lower at a second average cooling rate of 5° C./s or more;
an overaging treatment step of, after the continuous annealing step, holding the steel sheet in a temperature range of 150° C. or higher and 250° C. or lower for 30 seconds or more and 1,500 seconds or less; and
optionally, before or after the overaging treatment step, a coating step of subjecting a surface of the steel sheet to coating treatment.

10. A method for manufacturing a steel sheet, the method being a method for manufacturing the steel sheet according to claim 2, the method comprising:
a hot rolling step of hot-rolling a steel slab to obtain a hot-rolled steel sheet;
a cold rolling step of, after the hot rolling step, cold-rolling the hot-rolled steel sheet to obtain a cold-rolled steel sheet;
a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more,
subsequently cooling the resulting steel sheet to a holding temperature of an Ms temperature or higher and (Ms temperature+200° C.) or lower at a first average cooling rate of 5° C./s or more, holding the steel sheet at the holding temperature for a holding time of 1 second or more and 1,000 seconds or less, and cooling the steel sheet to a finish cooling temperature of 250° C. or lower at a second average cooling rate of 5° C./s or more;

an overaging treatment step of, after the continuous annealing step, holding the steel sheet in a temperature range of 150° C. or higher and 250° C. or lower for 30 seconds or more and 1,500 seconds or less; and optionally, before or after the overaging treatment step, a coating step of subjecting a surface of the steel sheet to coating treatment.

11. A method for manufacturing a steel sheet, the method being a method for manufacturing the steel sheet according to claim 3, the method comprising:

a hot rolling step of hot-rolling a steel slab to obtain a hot-rolled steel sheet;

a cold rolling step of, after the hot rolling step, cold-rolling the hot-rolled steel sheet to obtain a cold-rolled steel sheet;

a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more, subsequently cooling the resulting steel sheet to a holding temperature of an Ms temperature or higher and (Ms temperature+200° C.) or lower at a first average cooling rate of 5° C./s or more, holding the steel sheet at the holding temperature for a holding time of 1 second or more and 1,000 seconds or less, and cooling the steel sheet to a finish cooling temperature of 250° C. or lower at a second average cooling rate of 5° C./s or more;

an overaging treatment step of, after the continuous annealing step, holding the steel sheet in a temperature range of 150° C. or higher and 250° C. or lower for 30 seconds or more and 1,500 seconds or less; and optionally, before or after the overaging treatment step, a coating step of subjecting a surface of the steel sheet to coating treatment.

12. A method for manufacturing a steel sheet, the method being a method for manufacturing the steel sheet according to claim 4, the method comprising:

a hot rolling step of hot-rolling a steel slab to obtain a hot-rolled steel sheet;

a cold rolling step of, after the hot rolling step, cold-rolling the hot-rolled steel sheet to obtain a cold-rolled steel sheet;

a continuous annealing step of, after the cold rolling step, annealing the cold-rolled steel sheet in an atmosphere with a dew-point temperature of −60° C. or higher and −20° C. or lower at an annealing temperature equal to or higher than an $Ac_3$ temperature for a soaking time of 15 seconds or more, subsequently cooling the resulting steel sheet to a holding temperature of an Ms temperature or higher and (Ms temperature+200° C.) or lower at a first average cooling rate of 5° C./s or more, holding the steel sheet at the holding temperature for a holding time of 1 second or more and 1,000 seconds or less, and cooling the steel sheet to a finish cooling temperature of 250° C. or lower at a second average cooling rate of 5° C./s or more;

an overaging treatment step of, after the continuous annealing step, holding the steel sheet in a temperature range of 150° C. or higher and 250° C. or lower for 30 seconds or more and 1,500 seconds or less; and optionally, before or after the overaging treatment step, a coating step of subjecting a surface of the steel sheet to coating treatment.

13. A method for manufacturing a member, the method comprising a step of subjecting a steel sheet manufactured by the method for manufacturing a steel sheet according to claim 9 to at least one of forming and joining.

14. A method for manufacturing a member, the method comprising a step of subjecting a steel sheet manufactured by the method for manufacturing a steel sheet according to claim 10 to at least one of forming and joining.

15. A method for manufacturing a member, the method comprising a step of subjecting a steel sheet manufactured by the method for manufacturing a steel sheet according to claim 11 to at least one of forming and joining.

16. A method for manufacturing a member, the method comprising a step of subjecting a steel sheet manufactured by the method for manufacturing a steel sheet according to claim 12 to at least one of forming and joining.

* * * * *